UNITED STATES PATENT OFFICE.

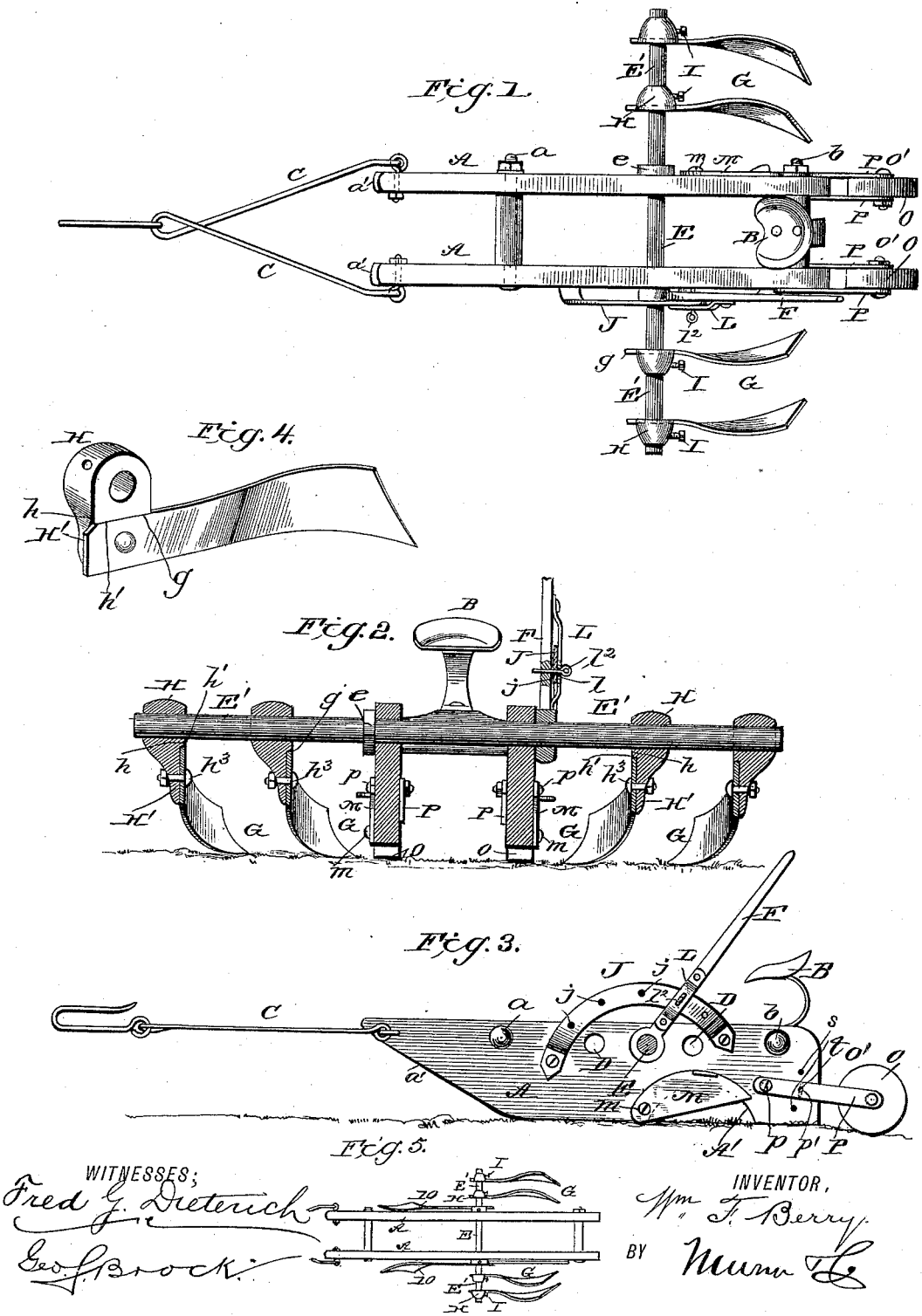

WILLIAM FRANKLIN BERRY, OF BLANCHARD, IOWA.

CULTIVATOR.

SPECIFICATION forming part of Letters Patent No. 396,853, dated January 29, 1889.

Application filed August 7, 1888. Serial No. 282,123. (No model.)

*To all whom it may concern:*

Be it known that I, WILLIAM FRANKLIN BERRY, residing at Blanchard, in the county of Page and State of Iowa, have invented a new and useful Improvement in Cultivators, of which the following is a specification.

My invention relates to improvements in cultivators, and has for its object to provide a cultivator more especially adapted to working listed corn during the early stages of its growth; and it consists in the peculiar construction and combination of parts, as will be hereinafter fully described and claimed, reference being had to the accompanying drawings, in which—

Figure 1 represents a top plan view of the improvement. Fig. 2 is a transverse section on line 2 2, Fig. 1. Fig. 3 is a side view of the runners and the adjusting-lever. Fig. 4 is a detail view, hereinafter referred to; and Fig. 5 is a detail view showing the improvement with the plow attachments, hereinafter referred to.

In the construction of my improved cultivator I provide a pair of runners, A A, arranged parallel to each other and at a short distance apart to enable them to travel one on each side of the corn-row.

The runners are strongly braced by the cross bolts and bars $a$ and $b$, upon the rear one, $b$, of which is mounted a driver's seat, B, as shown. The front ends of the runners A are beveled upwardly, as shown at $a'$ $a'$, and to the outer ends of which are attached the draft-bars C C. In their rear upper edges the runners A A are provided with a series of apertures, D D, through any pair of which passes a transverse shaft, E, said shaft being extended to each side of the runners, as shown at E' E'. To prevent lateral movement of said shaft in the apertures, it is provided with a collar, $e$, adapted to bear against the outside of one of the runners A. On the outside of the opposite runner a hand-lever, F, is journaled upon the shaft E. By thus forming the shaft with the collar $c$ upon one side of the runners and providing it with the lever F on the opposite side it is prevented from sidewise movement in its bearings.

Upon the outer ends, E', of the shaft E is mounted a series of covering-blades, G G, said blades consisting of rectangular metallic plates secured at their inner ends to the shaft E, and having their rear lower ends bent inwardly toward the runners A, as shown in Fig. 1.

To permit of a ready adjustment of said blades to allow a shallow or deep cut to be made, and also to permit of a ready detachment of the same from the shaft E, I provide a peculiar attachment, the construction of which is clearly shown in Fig. 4 of the drawings. Said attachment consists of a collar, H, mounted on the shaft, provided with a downwardly-depending lug, H', having a rabbet, $h$, forming a square shoulder, $h'$. The collar H is adjustable on said shaft, and is held in any desired position by means of a set-screw, I. The inner ends of the covering-blades G set in the rabbet $h$ and bear with their upper edges, $g$ $g$, against the square shoulder $h'$, and a single bolt, $h^3$, is passed through said blade G and lug H', thus securely attaching the blade G to the collar and lug.

Upon the outside of one of the runners A is secured a segmental plate, $j$, provided with a series of apertures, J. The lever F, previously referred to, which extends upward into close proximity to the driver's seat, is provided with a bail-like plate, L, which embraces the plate J, and is provided with an aperture, $l$, in line with the apertures $j$ in plate J. By adjusting the lever forward or backward the blades are raised or lowered to any desired degree, and when so adjusted the lever is held in place by a pin, $l^2$, passed through the apertures $j$ and $l$.

Near their outer ends the runners A are provided with a cut-out portion, A', and a fender, M, is pivoted at the upper front edge of said opening A' and held in position by means of a set-screw, $m$. By forming the runners with the fenders in the sides thereof dirt will be permitted to sift under the same when necessary. When corn is very small, an additional fender, O', is provided upon the ends of the runners, which consists of a small disk, O, journaled between two arms, P P, pivoted at their inner ends to the runners, as at $p$. To permit the disk O to be adjusted vertically, a series of apertures, $s$, are arranged in the end of the runners, and the arms P P are provided each with an aperture, $p'$, which registers with the apertures $s$, through which apertures and into any of the apertures $s$ a pin, $t$, may be entered to hold the disk in any desired adjustment.

By arranging the disk O in the manner described, and by adjusting the same, more or less dirt can be thrown around the corn. The disk also serves to lighten the draft on the runners when riding.

From the foregoing description, taken in connection with the drawings, the operation and advantages of my improvement will be readily understood. By forming the runners with a series of apertures adapted to receive the transverse shaft E it will be seen that when very young corn is being cultivated the shaft is placed in the forward aperture; but when the corn gets larger the shaft is placed in the rear holes, and the blades are thereby thrown farther back, and more dirt thereby permitted to be thrown about the corn. By attaching the blades to the shaft in the manner described and with the lever device specified the blades are readily adjusted as to the depth of plowing, &c.

In Fig. 5 of the drawings I have shown plows 10 attached to each side of the runners. These plows extend forward and are arranged close to the sides of the runners, as shown. By the addition of the plows and by placing the covering-blades G G closer together the improvement may be adapted for use as a harrow. The plows 10 are fastened to the shaft E in a manner similar to the coverers G. The plows 10, however, may be dispensed with, if desired.

It will also be understood that my improvement may be readily adapted for use in cultivating corn or potatoes or plowing in wheat, oats, or any small grain, and the peculiar attachments of the cultivator-blades to the shaft permit the ready adjustment of the same from one side to the other, and thus admit of the dirt being thrown in either way.

Having thus described my invention, what I claim as new, and desire to secure by Letters Patent, is—

1. In a cultivator, the combination, with the runners A A, having each a series of apertures, D D, coincident with each other, of the shaft E, adapted to be journaled in any one pair of said apertures, the ends of said shaft extended beyond the sides of runners A, said shaft provided with a series of covering-blades detachably secured to said ends, a collar, $e$, formed on said shaft, and a lever detachably mounted thereon, said lever and collar arranged upon the opposite outer sides of the runners A, whereby said shaft may be held in position in said apertures, substantially as and for the purpose described.

2. In a cultivator, the combination, with the runners A, a transverse shaft journaled thereon, and provided at its outer ends with covering-blades G, of the disks O, arranged to the rear ends of said runners, said disks journaled in ends of the arms P P, pivoted at their front ends to the runners, said disks adapted to be raised and lowered in relation to the lower rear edges of said runners, substantially as and for the purposes hereinbefore described.

3. In a cultivator, the combination of the runners A, provided with a series of apertures, D D, a transverse shaft, E, adapted to be adjustably journaled in the apertures, said shaft extended at each side of the runners and provided with covering-blades G, a lever, F, for adjusting the cutting depth of said blades, and the adjustable fender O′, consisting of a disk, O, journaled in arms P P, pivoted to the runners A and provided with an aperture, $p$, registering with apertures $s$, formed in the runners, and a pin adapted to be passed through the aperture, substantially as and for the purposes described.

4. In a cultivator, the combination, with the shaft E, of the blade attachment, said attachment consisting of a collar, H, adjustably secured to the shaft E, provided with a downwardly-depending lug, H′, having a rabbet, $h$, forming a square shoulder, $h'$, adapted to receive the squared end of the blade G, and means for securing such blade to the lug, substantially as shown and described.

WILLIAM FRANKLIN BERRY.

Witnesses:
J. R. PRUITT,
R. J. BIGGERSTAFF.